United States Patent Office 2,918,487
Patented Dec. 22, 1959

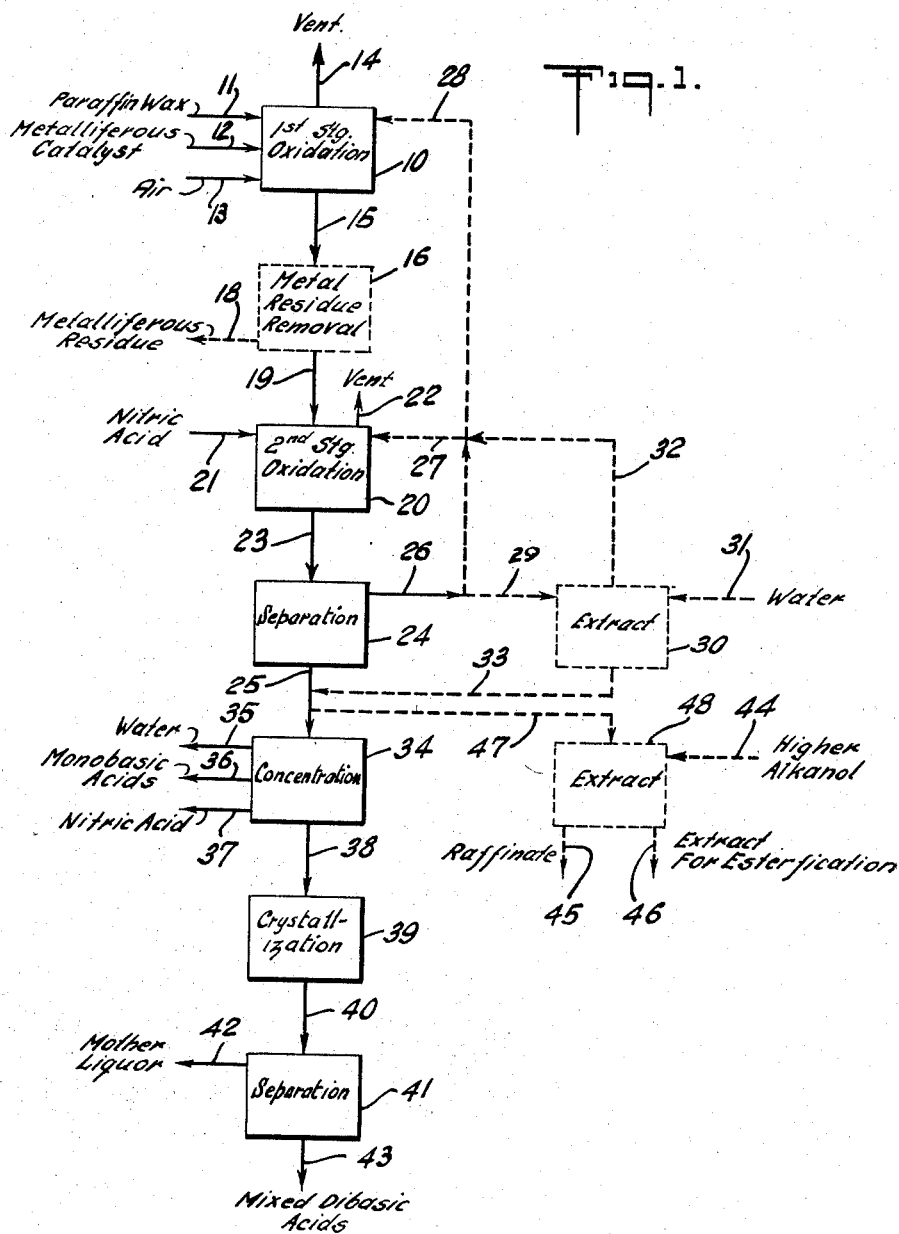

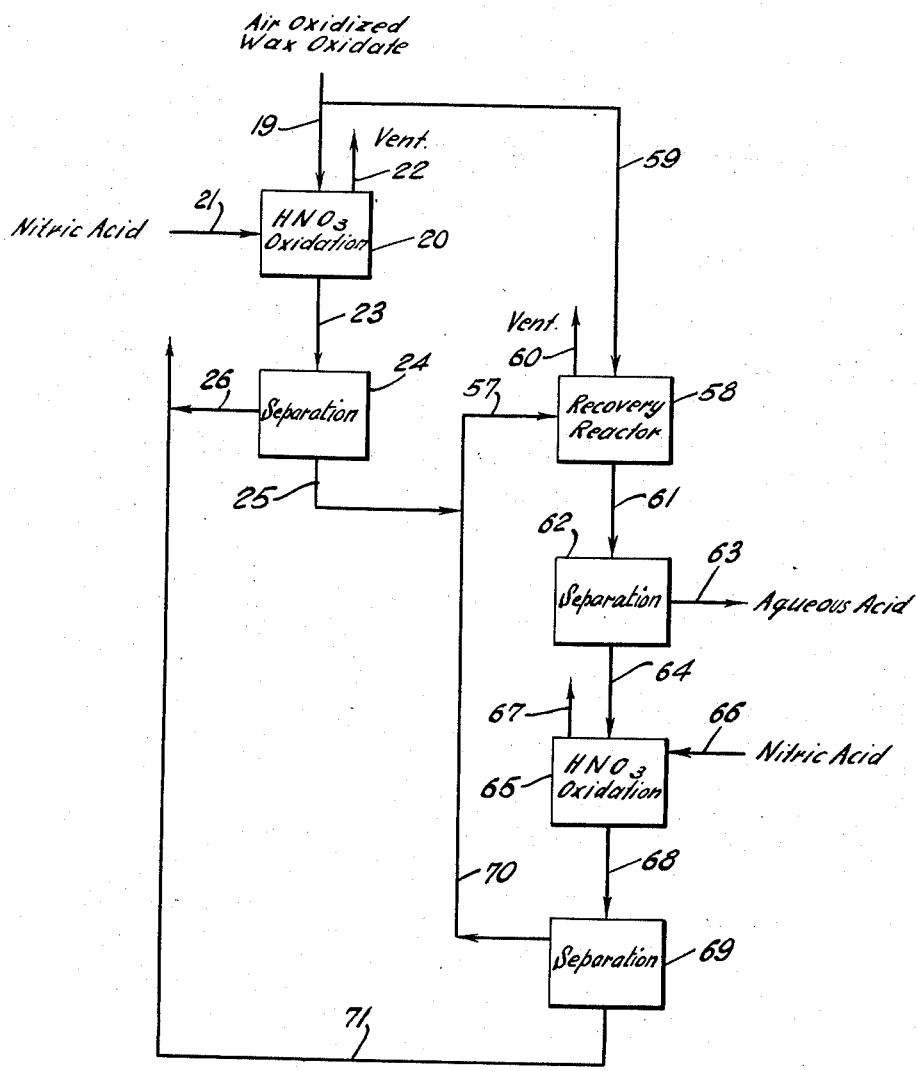

2,918,487

PROCESS FOR PRODUCING DIBASIC ACIDS

John A. Patterson, Fishkill, and Stanley M. Pier, Wappingers Falls, N.Y., assignors to Texaco Inc., a corporation of Delaware Application September 20, 1956, Serial No. 611,013

6 Claims. (Cl. 260—452)

This invention relates to a process for production of dibasic acids, and more particularly to a process for their production from paraffin wax.

The dibasic acids and their derivatives, e.g., succinic, glutaric, adipic, pimelic, and higher are useful in the manufacture of oil additives, plastics, plasticizers and synthetic lubricants. Esters of the higher molecular weight dibasic acids ($C_6+$) are particularly valuable as synthetic lubricants because of their low pour point and high viscosity index. The dibasic acids and their anhydrides are useful to manufacture alkyd resins with polyhydric alcohols. The acids may be converted also in conventional manner to amides, metal soaps and the like.

Broadly, our process for production of dibasic acids comprises forming a reaction mixture containing wax oxidate, the product of oxidizing macrocrystalline paraffin wax with a gas containing elemental oxygen, e.g., air, oxygen, and oxygen-enriched air, in the presence of a metalliferous catalyst to a saponification number of at least 200, and nitric acid; intensively agitating the reaction mixture and maintaining temperature thereof between 180° and 450° F. for at least one minute, thereby further oxidizing the wax oxidate; and recovering dibasic acids from the resulting mixture comprising further oxidized wax oxidate.

This two-stage process is rapid and efficient for obtaining good dibasic acid yields consistently and economically. However, it is of paramount importance that the air oxidation be carried on to obtain the aforesaid high saponification number, i.e. at least 200, advantageously 300 to 600, and preferably between 450 and 600, before the nitric acid oxidation step. Saponification number is determined by the procedure set forth in ASTM Method of Test D94–52T. By this control not only are very high yields of dibasic acids obtained, but also the excellent utilization of nitric acid is achieved and purification processing is simplified, perhaps due to the stripping out of light ends such as low molecular weight monobasic acids, etc., by extensive gas oxidation prior to the nitric acid treatment.

The macrocrystalline paraffin wax charge for the initial molecular oxygen oxidation (preparatory to the nitric acid treatment) is predominantly a straight-chain substance having from about 20 to 32 carbon atoms per molecule. We have found that quite high yields of dibasic acids can be obtained commencing with a semi-refined paraffin wax containing as little as 0.5% or less oil, a crude scale wax containing somewhat under 5% oil, or a wax concentrate such as is termed a "slack" wax in the trade.

The primary oxidation is conducted in the presence of a metalliferous catalyst and can be done in any conventional manner permitting attainment of the necessary high saponification number. Suitable oxidation of slack waxes for use in our process can be done according to the procedure described in the copending patent application of George B. Kirkwood and Edward F. Tweig, Serial No. 499,937, filed April 7, 1955, and entitled "Process for Producing Oil-Insoluble Materials," now U.S. Patent No. 2,847,439. The less oily waxes, such as a deoiled paraffin wax obtained by solvent dewaxing a distillate oil, pressing and sweating a distillate oil, or a combination process of extractive solvent refining, can be oxidized to the needed high saponification number with an oxygen-containing gas according to the process disclosed in the patent application of John K. McKinley, Serial No. 192,381, filed October 26, 1950, and now abandoned, and entitled "Process for Producing High Acid Content Wax Oxidate."

Highly oxidized wax oxidates produced from paraffin wax containing less than 5% oil by use of the latter process to obtain neutralization number to saponification number ratios to above about 0.6 are the preferred oxidate charge stocks for use in our invention. In such operations the deoiled paraffin wax is reacted with air in the presence of a metalliferous catalyst at temperature between about 230° to 360° F. and pressure of 30 to 300 p.s.i.g., employing an air feed rate of about 10 to 50 cubic feet per hour per pound of paraffin wax charged, and a superficial air velocity in a reactor between about 0.25 and 1.0. By superficial velocity of the air feed we mean the quotient of the expression (cubic feet per second of air feed measured at 60° F. and reactor inlet pressure: cross section normal to air flow of the empty reactor in square feet). The product of the air oxidation is an exceedingly complex mixture of carboxylic acids, ketones, esters, alcohols, aldehydes, lactones, etc.

In the nitric acid oxidation of the wax oxidate the nitric acid strength can be from an approximately 5% by weight in aqueous solution to virtually 100% nitric acid. Within this broad range there are two specific ranges of acid strength which can be used to special advantage, each range having specific advantage which will be discussed hereinafter.

In the high strength nitric acid oxidation the nitric acid concentration is advantageously from about 60 weight percent in aqueous solution to 100% nitric acid, and is preferably about 70% in aqueous solution. From 0.3 to 1 part by weight, generally about 0.66 nitric acid (measured as 100% nitric acid) per part of the paraffin wax oxidate is charged as feed to the high strength nitric acid oxidation embodiment of our process. The pressure used is approximately atmospheric to prevent explosions, and the temperature used is advantageously between about 180° and 240° F., preferably between about 200° and 220° F. To maintain this temperature range it is necessary to cool the reaction mixture; the strong nitric acid is ordinarily added to the wax oxidate at a rate slow enough to keep temperature from going above the control range. To get the best nitric acid utilization in any case it is necessary to agitate the reaction mixture vigorously, preferably with mechanical agitation. Reaction time to get the optimum dibasic yield should be at least a minute and need not be over 10 minutes.

The nitric acid oxidation can be run batch-wise or continuously, advantageously by incrementing (continuously or at intervals) adding the wax oxidate and nitric acid to a large agitated and cooled body of reaction mixture maintained as a heat dissipating medium wherefrom product mixture is withdrawn also incrementally to keep the volume of the reaction mixture essentially constant. Relatively inert diluent liquids such as carbon tetrachloride, benzene, nitrobenzene and the like can also be employed in the reaction mixture, and in some case volatilized, condensed and returned to assist in maintaining temperature control. We have found that use of the specific high strength nitric acid oxidation appears to give better overall utilization of the nitric acid than can be obtained by oxidation with more dilute nitric acid, but is more hazardous and more difficult to control temperature-wise.

In the low strength nitric acid oxidation the nitric acid used is advantageously broadly between 5 and 40% by weight aqueous nitric acid, and preferably between 10 and 20%. The temperature of the operation can be maintained between 250° and 400° F., preferably about 300° F., with ease. The reaction is operated at pressure between 200 and 800 p.s.i.g. Agitation of the reaction mixture by evolution of gaseous by-products is advantageously augmented by intensive mechanical agitation. In this weak acid process the weight proportion of the 100% nitric acid to wax oxidate is broadly between 0.4 and 1.2, and preferably about 0.8 part of 100% $HNO_3$ per part of wax oxidate initially charged. The weak acid process lends itself admirably to continuous operation.

The resulting mixture from the either type of nitric acid oxidation comprises further oxidized wax oxidate and water. It can be separated into two distinct liquid phases, a lower phase containing most of the water and dibasic acids (which phase we have termed an "aqueous phase" for convenience) and a supernatent phase containing unreacted paraffin, various lipophilic substances, some higher molecular weight dibasic acids, esters and the like (which phase we have termed the "oily-phase" for convenience). While simple gravity separation is preferred in this step of our process, accelerated separation by means of a centrifuge or the like is also possible. The oily phase is preferably recycled for reuse to either the nitric acid oxidation step, or to an air oxidation step as hereinbefore described preparatory to the nitric acid oxidation step. Before such recycling the oily phase can be extracted with water, nitric acid, or an organic solvent such as ethyl alcohol or acetic acid to recover an additional quantity of dibasic acids. The extract solution containing such recovered dibasic acids can be blended thereafter with the previously separated aqueous phase or be processed separately. Alternatively, the entire reaction product can be mixed with a halogenated solvent such as chloroform before separating the aqueous phase.

In general, we prefer to concentrate the separated aqueous phase by distillation before attempting to make ultimate recovery of dibasic acids. This is particularly advantageous when the nitric acid oxidation is conducted with weak acid. The aqueous fraction is fractionally distilled at reduced pressure, preferably about 300 mm. Hg absolute, and vapors comprising water and lower molecular weight mono-basic acids are taken as a distillate. Some of the nitric acid can also be distilled off, e.g., as a nitric acid-water azeotrope, but it is preferred to arrest concentration when the nitric acid-water azeotrope boiling temperature is indicated at the still head.

Alternatively, prior to concentration by distillation or evaporation, we have found it advantageous to extract the separated aqueous phase with a higher alkanol of 4 to 18 carbon atoms, e.g., n-butanol, 2-ethylhexanol, and n-decanol, and preferably isooctanol, the alkanol being used in about 1 to 4 volumes per volume of the aqueous layer. By so doing, we have found that a major portion of the higher molecular weight dibasic acids ($C_6+$) are effectively removed from the aqueous mixture along with a little nitric acid. The extract solution so formed can then be heated directly to obtain alkyl esters of the dibasic acids because the small amount of nitric acid in the extract solution acts as a catalyst for the esterification. Esters of the higher molecular weight dibasic acids have the greatest utility for use in synthetic lubricants.

Recovery of concentrated dibasic acids is done most conveniently by crystallizing them out of the high boiling concentrate of the aqueous phase obtained from the previously-described fractional distillation. The still pot residue from such distillation is cooled to approximately 0° F., although higher and lower temperatures from about 40° to about −40° F. can also be used. A magma of mixed dibasic acid crystals is obtained and filtered. The filtrate, a mixture of dibasic acids and concentrated nitric acid, can be recycled to the nitric acid oxidation reactor because the dibasic acids therein are reasonably stable toward further oxidation. Alternatively, the filtrate can be concentrated by redistillation and additional dibasic acids recovered from the resulting concentrate by recrystallization. This procedure can be repeated as many times as desired for recovery of additional dibasic acid values, not over four times being the general practice.

The mixed dibasic acid crystals can be purified by distillation, sublimation, or treating with a variety of solvent-solid adsorbent systems such as by redissolving in acetone, ethyl acetate, water or chloroform, contacting the solution with activated charcoal, silica gel, adsorptive clay or the like, separating the solid, and recrystallizing. Concentrates preponderating in specific dibasic acids can be made by column partition chromatography, e.g. by placing the mixed acids in aqueous solution on a column of moist silica gel and washing through the chloroform-butanol mixtures containing increasing proportions of the alcohol, the acids being eluted in reverse order to their molecular weight; or by the method described in U.S. Patent 2,716,133 utilizing fractional crystallization from halogenated solvents such as dichlorobenzenes.

Weight proportion of specific dibasic acids in the crystal mixture obtained from crystallizing the aqueous still bottom concentrate is approximately as follows: 5 to 10% $C_8$ and higher, 5 to 15% pimelic ($C_7$), 15 to 25% adipic ($C_6$), 15 to 30% glutaric ($C_5$), and 30 to 55% succinic ($C_4$).

A particular aspect of our invention is the removal or otherwise inactivation of metalliferous residue in the wax oxidate obtained by oxidizing paraffin wax with a gas containing elemental oxygen. We have found that a higher yield of the higher molecular weight ($C_6+$) dibasic acids is obtained from nitric acid oxidation of a wax oxidate wherein the metalliferous residue of the catalyst used in the preceding gas oxidation has been substantially completely removed or otherwise sequestered. This is important because the higher molecular weight dibasic acids have the aforementioned special utility for synthetic lubricants and the like. Thus the wax oxidate which has been produced by oxidation with a gas such as air in the presence of a polyvalent metal catalyst can be simply filtered, or treated with a cation exchange resin such as Amberlite IR–120 (the trade-name for a high density strongly acidic nuclear sulfonic acid cation exchange resin may by Rohm and Haas Company) or Dowex 50 (the trade-name of a similar strongly acidic cation exchange resin made by the Dow Chemical Company). Suitable cation exchangers are described, for example in U.S. Patent 2,736,741 of February 28, 1956.

In some cases a simple washing with water or a cold dilute solution of a mineral acid, e.g. nitric acid, is sufficient to remove metalliferous residue. In other cases metalliferous residue can be precipitated with a reagent such as 8-hydroxyquinoline and filtered from wax oxidate in petroleum naphtha solution (e.g. mixed hexanes) or effectively sequestered by washing with a dilute aqueous solution of a sodium polyphosphate or sodium hexametaphosphate, and discarding the aqueous extract. Certain chelating agents are also useful for such extraction, e.g. ethylenediamine tetraacetic acid and other amino acids of this nature.

The common metalliferous catalysts used in air oxidation are compounds of polyvalent metals such as naphthenates, stearates, metal salts of organic acids, or previously oxidized wax fractions, and the like. Compounds of manganese, chromium, vanadium, calcium, zinc, lead, titanium, mercury, and cerium are among the useful catalysts. In the air oxidation of paraffin wax potassium permanganate is the preferred catalyst, and it is employed in amounts ranging from 0.1 to 1% of the total wax charged, preferably about 0.4% dispersed in the wax as a water solution (which distributes the permanganate very uniformly during the air oxidation). Alternatively, oxides such as managanese dioxide, zinc oxide, and the like can be used.

Our process can be more fully understood by referring to the drawings. In Figure 1 molten paraffin wax is charged to first stage oxidation reactor 10 through line 11. Such wax is typically obtained by solvent dewaxing a paraffin-base distillate. Metalliferous catalyst such as an aqueous solution of potassium permanganate is also charged to reactor 10 through line 12, and air is introduced through line 13. The reaction mixture is heated rapidly to temperature of about 340° F. and then maintained in the control range by indirect heat transfer with submerged coils of heat exchange fluid. After 3 to 12 hours there is obtained a wax oxidate having saponification number above 200, generally approaching 500. This oxidate is withdrawn from vessel 10 by line 15.

At this stage the oxidate can be sent directly to a nitric acid oxidation in vessel 20 or, optionally and preferably, fed to vessel 16 and then filtered. Metalliferous residue is withdrawn from the system through line 18. In lieu of such filtration, it is also possible to use sequestration, ion exchange removal, or chelation, or precipitation of metalliferous residue.

The so-treated wax oxidate is then passed through line 19 into second stage oxidation reactor 20 wherein it is vigorously agitated with nitric acid at temperature between 180° and 450° F., the pressure and temperature being regulated in accordance with the nitric acid strength as hereinbefore discussed. By-product gases, e.g., carbon dioxide, nitrogen, nitrogen dioxide, and nitrous oxide, are vented from line 22. Nitrous gases of nitric oxide or nitrogen in a higher stage of oxidation can be recovered and converted to additional nitric acid in conventional fashion. The average residence time of the reaction mixture in vessel 20 should be at least one minute and need not be longer than 10 minutes.

The further oxidized wax oxidate is then withdrawn through line 23 and passed into gravity separator 24 (e.g. a tank) wherein a lower aqueous liquid phase and a supernatent oily liquid phase form. The oily phase is withdrawn from line 26 and can be recycled to the first stage oxidation vessel 10 by means of line 28, or to the second stage oxidation vessel by means of line 27. Optionally, the oily phase before recycle is passed through line 29 into extractor 30 wherein it is extracted with water or a light organic solvent such as methyl alcohol entering line 31. The oily raffinate is then withdrawn through line 32 and passed into line 27 and/or 28. The aqueous extract phase is withdrawn from extractor 30 by means of line 33 and admixed with the aqueous phase passing from separator 24 to concentrator 34 by means of line 25.

Concentration of the aqueous phase takes place in apparatus 34, e.g. a batch fractional distilling apparatus comprising a kettle, distilling column, still head, condenser, and auxiliary lines and controls. Low boiling materials such as water, monobasic acids and some nitric acid are withdrawn from the still head in conventional fashion and sent to tankage through lines 35, 36, and 37, respectively. When the nitric acid-water azeotrope boiling temperature occurs at the still head in the reduced pressure distillation, concentration is arrested and the still bottoms are passed through line 38 into crystallizer 39. Herein the still bottoms are cooled to about 0° F. Optionally, before cooling, nitric acid traces can be removed by treatment of the still bottoms with a weakly basic ion exchange resin, e.g. the kind described in U.S. Patent 2,689,832; alternatively, much or all of the nitric acid traces can be precipitated with organic bases, e.g. quinaldine, ortho or meta toluidine, "Nitron" (the trade-name for 1,4-diphenyl-3,5-endo anilino-4,5-dihydro-1,2,4-triazole), or the like, and the still bottoms filtered. After cooling there results a slurry of crystalline dibasic acids in mother liquor. This is passed through line 40 into separator 41, e.g., a filter. Mother liquor is withdrawn from line 42 and can be further concentrated, recrystallized, and separated for retained dibasic acid values. However, the mother liquor is preferably recycled to vessel 20 for reprocessing along with fresh wax oxidate. Mixed dibasic acids are withdrawn from separator 41 by means of line 43 and may be further purified by distillation, sublimation, or recrystallization from solvents, optionally after having been treated with a solid absorbent such as activated charcoal.

A further embodiment of our process includes withdrawing at least a portion of the aqueous phase from separator 24 through lines 25 and 47 into extractor 48. Herein a higher alkanol such as isooctanol is admitted through line 44, thoroughly contacted with the aqueous material, and separated into a raffinate phase, which is withdrawn through line 45, and an extract solution phase, which is withdrawn through line 46. The oily raffinate can be recycled to vessels 10 and/or 20 for reprocessing along with fresh oxidizable material. The extract solution, containing alkanol, dibasic acids, and a small amount of nitric acid, can be used directly as an esterification reaction mixture in conventional fashion.

Materials of construction for the air oxidation reactor is preferably aluminum or an austenitic stainless steel, but also can be made of other corrosion-resisting materials such as glass-lined steel and the like. Corrosion-resistant equipment such as austenitic stainless steel is preferred throughout the rest of the system. Intermittent storage facilities, pumps, valves and other auxiliary equipment have not been shown in the foregoing drawing, but are provided wherever necessary or desirable.

Figure 2 represents a modification of the nitric acid oxidation step to utilize nitric acid values to the greatest extent. In this modification air oxidized wax oxidate is passed into second stage oxidation reactor 20 by means of line 19 and reacted as described hereinbefore with nitric acid entering line 21. The further oxidized product is withdrawn through line 23 and passed into gravity separator 24 wherein a lower aqueous liquid phase and a supernatent oily liquid phase form. The oily phase is withdrawn from line 26 and can be recycled to first stage oxidation vessel 10 or to second stage oxidation vessel 20.

The aqueous phase is withdrawn from separator 24 by means of line 25 and passed through line 57 into recovery reactor 58, which is fed with a supplementary portion of air oxidized wax oxidate entering line 59. In the recovery reactor residual nitric acid in the aqueous phase is further reacted with the supplemental portion of air oxidized wax oxidate at 250–400° F. and 200–800 p.s.i.g. using intensive agitation. This serves to cut down on and substantially eliminate any excess nitric acid being fed to the dibasic acid concentration step. The reaction products from the recovery reactor are passed through line 61 into gravity separator 62 wherein a lower aqueous phase and a supernatent oily liquid phase again form. The aqueous phase containing dibasic acids is withdrawn from the separatory by means of line 63 and passed to the concentration step described in connection with Figure 1. The oily liquid phase is withdrawn by means of line 64 and can be sent back to vessel 20 for further oxidation, or, preferably, passed to another oxidation reactor 65 wherein it is contacted with fresh nitric acid entering line 66 in accordance with the principles of my invention. The reaction products of this operation is passed then by means of line 68 into gravity separator 69. The lower aqueous liquid phase is recycled by means of lines 70 and 57 to the recovery reactor 58, while the supernatent oily phase is passed through line 71 and then joins other oily phase material being withdrawn from line 26 for subsequent recycle use.

The following examples show ways in which our invention has been practiced but are not to be construed as limiting the invention. All parts shown are parts by weight and all percentages are weight percentages except as otherwise specially noted.

Example 1

10 parts of a petroleum oxidate fraction, obtained as the naphtha-insoluble (light naphtha having E.B.P. of 200° F. from a paraffin base crude) portion of an oxidate made by air-blowing a semi-refined 125 to 127° F. melting point macrocrystalline petroleum wax in the presence of a metalliferous catalyst, said oxide fraction having a neutralization number of 198 and a saponification number of 306, was heated to 86° F. 50 parts by weight of concentrated (70%) nitric acid was added in five portions with stirring and the maximum temperature reached was 108° F. After the reaction the entire product was mixed with 75 parts by volume of water. This mixture was extracted twice with 25 parts by volume of ether and separated into a water phase and an ether extract phase. Upon evaporation of the water phase, a crystalline solid was obtained which was soluble in 20% sodium hydroxide solution and also released carbon dioxide from 10% sodium carbonate solution. A sample of this solid had a neutralization No. of 880 indicating that it was preponderantly of dibasic acid. By evaporation of the ether extract a hard waxy residue was recovered which had a neutralization No. of 418.

Example 2

300 parts of an oxidate, prepared by air blowing a semi-refined 125° to 127° F. melting point macrocrystalline petroleum wax in the presence of a metalliferous catalyst, having a neutralization No. of 324, saponification No. of 473, hydroxyl No. of 11, and containing 6.8% unsaponifiable material, was oxidized with 200 parts by weight of concentrated (70%) nitric acid. The oxidate was heated to about 90° C. (194° F.) and the nitric acid added dropwise during 4 hours at rate to control the temperature between 91 and 97° C. (196–207° F.). During the run, gases were formed which had the following composition, mol percent: nitrogen plus carbon monoxide, 10; carbon dioxide, 44; nitrous oxide, 19; nitric oxide, 25; and balance, 2. The liquid product was extracted with 200 parts by volume of methylpentanes and the aqueous and organic layers separated. Crude dibasic acids were separated from the aqueous phase by distilling until crystallization of the residue started, chilling the distillation residue, filtering off the crystals and then further concentrating the liquid filtrate by distillation. This process was repeated to obtain 3 batches of crystals whose total amount was 139 parts, equivalent to 46.4% of the oxidate charged. The bulk of these crystals (115 parts) obtained in the first separation had a neutralization No. of 647. By column partition chromatography this fraction was shown to contain 35.2% succinic acid, 15.7% glutaric acid, 19.1% adipic acid, 9.3% pimelic acid and 19.7% higher dibasic acids. The organic layer was stripped of methylpentanes by distillation leaving a waxy residue amounting to 137 parts equivalent to 45.6% of the original oxidate charge.

Example 3

50 parts of the naphtha insoluble portion of a wax oxidate, prepared by airblowing semi-refined 125 to 127° F. melting point paraffin wax in the presence of metalliferous catalyst, having a neutralization No. of 286, a saponification No. of 489, and containing 1.7% unsaponifiable material, was charged to a stainless steel steam heated autoclave together with 80 parts by volume concentrated (70%) nitric acid and 765 parts by volume of water. Stirring was started and the autoclave was heated at 300° F. for 3 hours during which time the pressure rose to 570 lbs. per square inch. The reactor was cooled to room temperature, the resultant gases were bled off through a caustic trap. The liquid product was blended with 100 parts by volume of chloroform and then syphoned from the reactor. The aqueous layer was separated and concentrated, cooled, and filtered to isolate dibasic acids. Concentration and filtration were repeated three times to obtain a total yield of 38 parts by weight of crude dibasic acids, equivalent to 76 weight percent of the wax oxidate charged. The organic layer was stripped of chloroform by distillation leaving an oily residue amounting to 9 parts, equivalent to 18% of the oxidate charged, and having a neutralization No. of 354.

Example 4

Crude wax oxidate, prepared by the air oxidation of semi-refined 125 to 127° F. melting point petroleum wax using 0.4 potassium permanganate as catalyst and having a neutralization No. of 311, saponification No. of 475, hydroxyl No. of 14, carbonyl No. of 5, iodine No. of 3, 7% unsaponifiable material, and 0.19% ash was filtered at 80° C. to remove 0.9% of insoluble material. By this treatment the ash content was reduced to 0.014%, indicating that substantially all of the metalliferous catalyst residue was removed. 300 parts of the filtered oxidate and 2400 parts of 10% nitric acid were placed in a stainless steel autoclave and stirred and heated at 300° F. for one hour. The pressure developed was 440 lbs. per square inch. The reactor was cooled and the product diluted with 300 parts by volume of chloroform. Upon separation and distillation of the aqueous layer the crude dibasic acids were obtained as the residue. The following acids were present:

| | Parts |
|---|---|
| Succinic acid | 42 |
| Glutaric acid | 23.8 |
| Adipic acid | 21 |
| Pimelic acid | 12.6 |
| Suberic acid | 8.4 |
| Azeleic acid | 2.8 |
| Higher acids | 1.4 |

Upon distilling off the chloroform from the organic layer a residue amounting to 118 parts, or 39.3% of the oxidate charged, was obtained.

By way of contrast, oxidation using the same procedure on the same wax oxidate except that it was unfiltered and thus contained all metalliferous residue from the air oxidation, the following dibasic acids were obtained:

| | Parts |
|---|---|
| Succinic acid | 42.4 |
| Glutaric acid | 23 |
| Adipic acid | 17.4 |
| Pimelic acid | 10.7 |
| Suberic plus azeleic acid | 8.0 |
| Higher acids | 0.7 |

The chloroform soluble material amounted to 126 parts or 42% of the oxidate charged. These data show that the procedure using substantial removal of metalliferous catalyst residue from the air oxidation product gave more than 25% higher production of higher molecular weight ($C_6+$) dibasic acids than when this step was omitted.

Example 5

Three runs were made each by charging 150 parts of an oxidate obtained by the air oxidation in the presence of 0.4% potassium permanganate catalyst of a semi-refined 125 to 127° F. melting point petroleum wax, having a neutralization No. of 243, a saponification No. of 365, and 12.8% unsaponifiable material, together with 240 parts by volume of concentrated (70%) nitric acid and 2300 parts by volume of water to a stainless steel autoclave. The autoclave was heated at 300° F. for three hours with stirring, cooled and vented. The product mixed with 150 parts of chloroform. The dibasic acids isolated from the resulting aqueous solutions amounted to from 69 to 75 parts in the several runs, the average yield of dibasic acids being 48% based on the oxidate charged. The amounts of chloroform soluble material varied from 53 to 55 parts, or an average of 36% of the oxidate charged.

150 parts of a composite of the chloroform-soluble materials from the above three runs was stripped of chloroform, then using 240 parts by volume of concentrated 70% nitric acid and 2300 parts by volume of water at temperature of 300° F. and autogenous pressure for three hours with stirring. Upon venting the reactor, dissolving the product in chloroform, separating the aqueous and organic layers, and distilling the respective solutions, 41.5 parts of crude, water-soluble dibasic acids, equivalent to 27.7% of the chloroform-soluble material charged or 13.3% of the original oxidate used, and 77 parts of a waxy product equivalent to 51.3% of the charge, was obtained.

*Example 6*

In addition to the dibasic acids present in the aqueous part of the reaction products, some high molecular weight dibasic acids were also present in the organic phase which could be isolated by extraction with water at high temperature.

1500 parts of the oily layer from a nitric acid-wax oxidate reaction was extracted with 2250 parts of water at 310° F. in a stainless steel autoclave. By then extracting the water extract with ethyl ether in a continuous extractor and stripping off the ether, a brown waxy solid was obtained which contained the following:

| | Parts |
|---|---|
| Glutaric acid | 1.3 |
| Adipic acid | 3.1 |
| Pimelic acid | 4.1 |
| Suberic acid | 25.7 |
| Azeleic acid | 1.3 |
| Other material | 27.5 |

The water, after ether extraction, was evaporated, leaving a dark viscous oil which contained the following:

| | Parts |
|---|---|
| Succinic acid | 8.3 |
| Glutaric acid | 5.4 |
| Adipic acid | 5.8 |
| Pimelic acid | 3.3 |
| Suberic and azeleic acids | 6.7 |
| Other material | 37.5 |

*Example 7*

100 parts by volume of the aqueous phase from nitric acid oxidation operated in a manner similar to the one described in Example 3, above, said aqueous phase containing 5.53 parts by weight of dibasic acids, was extracted with 25 parts by volume of isooctyl alcohol. 60.4% of the dibasic acids were extracted by the alcohol, and, as shown in the table below, the higher molecular weight acids were concentrated in the alcohol resulting in a solution suitable for esterification.

| | Unextracted Aqueous Solution, parts | Extracted Aqueous Solution, parts | Isooctyl Alcohol Extract, parts | Weight, Percent Extracted |
|---|---|---|---|---|
| Total Dibasic Acids | 5.53 | 2.19 | 3.34 | 60.4 |
| Succinic Acid | 1.13 | 0.62 | 0.51 | 45.1 |
| Glutaric Acid | 1.75 | 0.705 | 1.045 | 59.5 |
| Adipic Acid | 1.35 | 0.565 | 0.985 | 72.9 |
| Pimelic Acid | 0.74 | 0.21 | 0.53 | 71.9 |
| Suberic and Higher Acids | 0.56 | 0.09 | 0.47 | 83.9 |

*Example 8*

The following table describes the operating conditions of a continuous dibasic acid production unit during 3 periods of 11.42 hours, 11.08 hours, and 8.75 hours, respectively. The wax oxidate, made by air oxidation of paraffin wax in the presence of metalliferous catalyst, had neutralization No. of 295, saponification No. of 474, 2% of unsaponifiables, API gravity of 1.50, SSU viscosity at 210° F. of 113, and 0.47% ash. The wax oxidate and nitric acid were separately preheated and fed into the base of a vertical cylindrical reactor jacketed for temperature control and packed with Berl saddles. The oxidized product was withdrawn near the top of the reactor, cooled, and separated into oily and aqueous fractions.

| | First Period | Second Period | Third Period |
|---|---|---|---|
| Wax Oxidate Charge Rate, Parts per Hour | 4.78 | 4.81 | 8.20 |
| Nitric Acid Charge Rate, Parts per Hour (as 100% $HNO_3$) | 4.01 | 4.00 | 6.99 |
| Weight Percent Nitric Acid Concentration | 10.7 | 10.6 | 14.5 |
| Temperatures, °F.: | | | |
| Wax Oxidate to Reactor | 312 | 312 | 243 |
| Acid to Reactor | 319 | 320 | 261 |
| Reactor Outlet | 352 | 352 | 384 |
| Cooler Outlet | 146 | 146 | 152 |
| Reactor Pressure, p.s.i.g. | 222 | 217 | 310 |
| Superficial Residence Time, Minutes, based on charge liquid densities at 60° F. and the charge flowing through empty reactor in the absence of evolved gas | 13.9 | 13.8 | 10.6 |
| Vent Gas, Parts per Hour | 2.48 | 2.35 | 4.4 |
| Vent Gas, Composition, Volume Percent: | | | |
| $N_2$ | 15 | 15 | 9.9 |
| CO | | | 5.8 |
| $CO_2$ | 49 | 49 | 48.2 |
| $N_2O$ | 15 | 15.5 | 14.2 |
| NO | 21 | 20.5 | 21 |
| HCN | 0 | 0 | 0.2 |
| Air | 0 | 0 | 0.7 |
| Oily Phase Production, Parts per Hour | 1.955 | 2.545 | 3.13 |
| Aqueous Phase Production, Parts per Hour | 37.4 | 37.1 | 47.3 |
| Overall Recovery, Weight Percent | 99 | 98.6 | 97.2 |
| Collected Aqueous Phase Analysis: | | | |
| Total Nitric Acid, Parts | 7.76 | 7.33 | 7.80 |
| Total Dibasic Acids, Parts | 24.08 | 20.98 | 30.13 |
| Succinic | | | 10.40 |
| Glutaric | | | 6.10 |
| Adipic | | | 5.38 |
| Pimelic | | | 3.23 |
| Suberic | | | 5.02 |
| Azeleic | | | |
| Total Nitric Acid Reacted, Parts | 38.04 | 36.97 | 53.35 |
| Parts of Dibasic Acids per Part of Wax Oxidate Charged | 0.441 | 0.393 | 0.420 |
| Parts of Dibasic Acids per Part of Nitric Acid Consumed | 0.633 | 0.567 | 0.565 |

We claim:

1. A process for production of dibasic acids which comprises oxidizing macrocrystalline paraffin wax with a gas containing elemental oxygen in the presence of a metalliferous catalyst until the resultant reaction mixture has a saponification number between 450 and 600, thereby forming a wax oxidate containing metalliferous residue; substantially completely removing said metalliferous residue from the wax oxidate; further oxidizing said wax oxidate with 60–100% nitric acid at temperature between about 200° and 220° F. and pressure substantially atmospheric for at least about one minute with intensive agitation; separating the resulting reaction mixture into an aqueous phase and an oily phase; and recovering dibasic acids from said aqueous phase.

2. The process of claim 1 wherein said oily phase is recycled to at least one of the foregoing oxidation steps.

3. A process for production of dibasic acids which comprises oxidizing macrocrystalline paraffin wax with a gas containing elemental oxygen in the presence of a metalliferous catalyst until the resulting reaction mixture has saponification number between 300 and 600, thereby forming a wax oxidate feed containing metalliferous residue; substantially completely removing said metalliferous residue from the wax oxidate feed; further oxidizing said wax oxidate feed with 5–40% nitric acid at temperature between about 250° and 400° F. and pressure between 200 and 800 p.s.i.g. for at least about one minute with intensive agitation; separating the resulting reaction mixture into an aqueous phase and an oily phase; and recovering dibasic acids from said aqueous phase.

4. The process of claim 3 wherein said oily phase is recycled to at least one of the foregoing oxidation steps.

5. The process of claim 3 wherein said separated aqueous phase is passed into agitated contact with supplemental wax oxidate feed at temperature between about 250° and 400° F. and pressure between 200 and 800 p.s.i.g. for at least about one minute, said supplemental wax oxidate feed containing no substantial quantity of metalliferous residue and having been made by oxidation with elemental oxygen; the reaction mixture thus formed is separated into a second aqueous phase and a second oily phase; and dibasic acids are recovered from said second aqueous phase.

6. A process for production of dibasic acids which comprises oxidizing macrocrystalline paraffin wax with a gas containing elemental oxygen in the presence of a metalliferous catalyst until the resulting reaction mixture has a saponification number of at least about 200, thereby forming a wax oxidate containing metalliferous residue; substantially completely removing said metalliferous residue from the wax oxidate; further oxidizing the wax oxidate with nitric acid at a temperature between about 180° and 450° F. using intensive agitation; and recovering dibasic acids from the resulting mixture comprising further oxidized wax oxidate.

References Cited in the file of this patent

UNITED STATES PATENTS

| | | |
|---|---|---|
| 2,723,988 | Nelson | Nov. 15, 1955 |
| 2,771,482 | Brown et al. | Nov. 20, 1956 |
| 2,779,779 | Meyer et al. | Jan. 29, 1957 |
| 2,791,598 | Brown et al. | May 7, 1957 |
| 2,794,040 | Annable et al. | May 28, 1957 |